United States Patent
Jacoby et al.

(10) Patent No.: US 11,731,461 B2
(45) Date of Patent: Aug. 22, 2023

(54) TIRE HAVING A MULTILAYER TREAD CAP

(71) Applicant: THE GOODYEAR TIRE & RUBBER COMPANY, Akron, OH (US)

(72) Inventors: Claude Charles Jacoby, Wasserbillig (LU); Olivier Francis Bindner, Yutz (FR); Fabien Ocampo, Thionville (FR); Sébastien Morin, Mertzig (LU); Sabine Chantal Gabriel, Harzé (BE); Virginie Schwinn, Colmar-Berg (LU); Thomas Charles Pierre Roland, Luxembourg (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 88 days.

(21) Appl. No.: 17/340,253

(22) Filed: Jun. 7, 2021

(65) Prior Publication Data
US 2021/0402827 A1 Dec. 30, 2021

Related U.S. Application Data

(60) Provisional application No. 63/045,986, filed on Jun. 30, 2020.

(51) Int. Cl.
*B60C 11/00* (2006.01)

(52) U.S. Cl.
CPC ..... *B60C 11/005* (2013.01); *B60C 2011/0033* (2013.01); *C08L 2205/03* (2013.01)

(58) Field of Classification Search
CPC .......... B60C 11/005; B60C 2011/0025; B60C 2011/0016; B60C 27/0246
See application file for complete search history.

(56) References Cited

U.S. PATENT DOCUMENTS

| 5,997,673 | A | * | 12/1999 | Sandstrom | ............ | B60C 11/005 |
| | | | | | | 156/128.6 |
| 9,764,594 | B2 | | 9/2017 | Isitman et al. | | |

(Continued)

FOREIGN PATENT DOCUMENTS

| CN | 101007491 A | 8/2007 |
| CN | 102532627 A | 7/2012 |

(Continued)

OTHER PUBLICATIONS

Extended European Search Report dated Nov. 29, 2021 for European Patent Application 21179876.4, the European counterpart to the subject patent application.

(Continued)

*Primary Examiner* — Robert C Dye
*Assistant Examiner* — Wendy L Boss
(74) *Attorney, Agent, or Firm* — Alvin T. Rockhill

(57) ABSTRACT

This invention discloses a tire tread comprising: (a) a first tread cap layer comprising a first rubber composition; and (b) a second tread cap layer arranged radially inside of the first tread cap layer comprising a second rubber composition; wherein at 0° C. the rebound resilience of the first rubber composition is within a range of 10% to 25%, the rebound resilience of the second rubber composition is within a range of 15% to 35% and is at least 5% lower than that of the second rubber composition; and wherein at 100° C. the rebound resilience of the first rubber composition is within a range of 45% to 65%, the rebound resilience of the second rubber composition is within a range of 60% to 75% and is at least 3% higher than that of the first rubber composition.

11 Claims, 1 Drawing Sheet

(56) References Cited

U.S. PATENT DOCUMENTS

| | | |
|---|---|---|
| 2004/0122157 A1 | 6/2004 | Labauze |
| 2012/0012236 A1* | 1/2012 | Sandstrom ............ B60C 1/0016 |
| | | 152/209.1 |
| 2012/0029114 A1* | 2/2012 | Francik ................ C08K 5/548 |
| | | 523/156 |
| 2012/0157568 A1* | 6/2012 | Sandstrom ............... C08L 9/06 |
| | | 524/502 |
| 2014/0041776 A1 | 2/2014 | Reinardt et al. |
| 2015/0107735 A1* | 4/2015 | Djelloul-Mazouz ........................ |
| | | B60C 11/0058 |
| | | 152/209.1 |
| 2016/0159157 A1* | 6/2016 | Jacoby ................. B60C 1/0016 |
| | | 152/450 |
| 2019/0062532 A1* | 2/2019 | Isitman .................... C08L 7/00 |
| 2021/0260925 A1* | 8/2021 | Bruneau ............. B60C 11/0058 |

FOREIGN PATENT DOCUMENTS

| | | | |
|---|---|---|---|
| CN | 108148231 A | 6/2018 | |
| CN | 109422939 A | 3/2019 | |
| CN | 109422942 A | 3/2019 | |
| EP | 0105822 A2 | 4/1984 | |
| EP | 2325241 A1 * | 5/2011 | ........... C08K 3/0033 |
| EP | 2452834 A2 | 5/2012 | |
| EP | 2457743 A1 | 5/2012 | |
| EP | 2695748 A1 | 2/2014 | |
| EP | 2990226 A1 | 3/2016 | |
| WO | 20170104781 A1 | 6/2017 | |
| WO | 2017117056 A1 | 7/2017 | |

OTHER PUBLICATIONS

Chinese Search Report dated Dec. 30, 2022 for Chinese Patent Application 202110734442.9, the Chinese counterpart to the subject patent application.

* cited by examiner

TIRE HAVING A MULTILAYER TREAD CAP

This application claims benefit of U.S. Provisional Patent Application Ser. No. 63/045,986 filed on Jun. 30, 2020. The teachings of U.S. Provisional Patent Application Ser. No. 63/045,986 are incorporated herein by reference in their entirety.

FIELD OF THE INVENTION

The present invention is directed to a tire having a tread with multiple tread cap layers. For instance, the tread can be comprised of two or more different tread cap layers. The tire can be an automobile tire and in particular can be a snow tire.

BACKGROUND OF THE INVENTION

As known in the tire art, it has traditionally been difficult to improve multiple tire characteristics at the same time without considerable trade-offs in at least another characteristic. One of such conflicts exists between rolling resistance and wet performance. When rolling resistance is to be improved, there are typically trade-offs in wet grip. However, limiting rolling resistance is crucial to increase energy efficiency. Similarly, there is typically a conflict between wet and snow performance. If it is the target to improve snow performance, there is usually again a trade-off in wet performance. Accordingly, it would be desirable to provide a tire, in particular a winter tire, which has improved wet performance while simultaneously maintaining good rolling resistance (to maintain good vehicle fuel economy). Preferably, this objective can be attained with good snow performance also being achieved.

An example of a winter tread compound has been suggested in U.S. Pat. No. 9,764,594 which allows for a compromise between wear and wet performance, while providing advanced snow performance. This patent is more specifically directed to a pneumatic tire having a tread comprising a vulcanizable rubber composition comprising, based on 100 parts by weight of elastomer (phr), (A) from about 50 to about 90 phr of a solution polymerized styrene-butadiene rubber having a glass transition temperature (Tg) ranging from −65° C. to −55° C. and functionalized with an alkoxysilane group and at least one functional group selected from the group consisting of primary amines and thiols; (B) from about 50 to about 10 phr of polybutadiene having a cis-1,4 microstructure content greater than 95 percent and a Tg ranging from −80° C. to −110° C.; (C) from 30 to 80 phr of a combination of a resin having a Tg of at least 30° C. and an oil, wherein the weight ratio of resin to oil is greater than 1.

Other compounds have been suggested in International Patent Application No. 2017/117056 which aims at finding a compromise between different tire characteristics including aspects of winter performance.

While it may not always be possible to achieve improvements in all of the abovementioned properties, a significant room for improvement remains in the development of advanced tire treads, in particular for winter tires. Accordingly, there remains a long felt need for winter tires that offer a combination of good wear characteristics, dry traction, wet and snow performance, and/or reduced rolling resistance for improved energy economy.

SUMMARY OF THE INVENTION

A first object of the invention may be to provide an advanced tire tread providing on the one hand good wet grip (and/or dry grip) and on the other hand a good rolling resistance, in particular suitable for treads of winter tires and/or all-season tires.

Another object of the invention may be to provide an advanced snow tire with advanced wet grip (and/or dry grip) and limited rolling resistance.

Thus, in one aspect of the invention a tire is provided, the tire comprising a tread further comprising a first tread cap layer intended for contacting a road when driving (or in other words a radially outermost tread cap layer), wherein the first tread cap layer comprises a first rubber composition. Moreover, the tire comprises a second tread cap layer arranged radially inside of (or below) the first tread cap layer and supporting the first tread cap layer, wherein the second tread cap layer comprises a second rubber composition different, or in other words compositionally different, from the first rubber composition. A rebound resilience of the first rubber composition, determined at a temperature of 0° C. according to DIN 53512 (a German industry standard), is within a range of 10% to 25% (preferably 10% to 20%, or 10% to 19%), and a rebound resilience of the second rubber composition, determined at a temperature of 0° C. according to DIN 53512, is within a range of 15% to 35% (preferably 20% to 35%, or preferably 20% to 30%, or 21% to 30%), wherein said rebound resilience of the first rubber composition is at least 5% lower (preferably at least 10% lower, and optionally at most 20% lower) than said rebound resilience of the second rubber composition. Furthermore, a rebound resilience of the first rubber composition, determined at a temperature of 100° C. according to DIN 53512, is within a range of 45% to 65% (preferably 50% to 65%, or 50% to 59%), and a rebound resilience of the second rubber composition, determined at a temperature of 100° C. according to DIN 53512, is within a range of 60% to 75% (preferably 60% to 70%, or 61% to 70%), and wherein said rebound resilience of the second rubber composition, determined at a temperature of 100° C., is at least 3% higher (preferably 4% or 5% higher, and optionally at most 20% higher) than said rebound resilience of the first rubber composition, determined at a temperature of 100° C. In particular, the rebound values at 0° C. can be considered as wet traction indicators and the rebound values at 100° C. can be considered as rolling resistance indicators. The above ranges for 0° C. rebound resilience and 100° C. rebound resilience in the described dual cap construction comprising two tread cap layers, result in an advanced balance of rolling resistance and wet grip of the tire tread. Thus, said properties have been balanced by the defined multi tread cap construction.

In one embodiment, the tire is a snow tire. In particular, a tire is considered herein as a snow tire if it has the "three peak mountain snow flake symbol" also known as "3PMSF" symbol, typically visible on a sidewall of the tire. Thus, also an all-season tire or any tire having the three peak mountain snow flake symbol is considered as a snow tire herein.

In another embodiment, the tread comprises at least one circumferential groove and/or at least one groove separating two tread ribs, wherein said at least one groove has a radial depth d extending from the radially outermost surface of the unworn tread to a bottom of the (respective) groove, wherein the radial depth d is equal to a radial height or radial length of 4 mm plus a radial height or length t, and wherein the first tread cap layer has over at least 80% of its (total) axial width a radial thickness within a range of t−1 mm to t+1 mm (or t−0.5 mm to t+1 mm; or t to t+1 mm; or t to t+0.5 mm). In other words, the first tread cap layer extends in a radial direction from the radially outermost surface of the tread radially inwards to a radial height which is within a range of +/−1 mm (or the further above mentioned options) of a remaining 4 mm tread depth measured from the bottom of the groove. Preferably, d, t and/or the 4 mm are determined at a circumferential groove closest to the equatorial plane of the tire or in case of a (preferably non-circumferential) groove separating two tread ribs at an axial position having a distance within a range of 2 cm to 5 cm from the equatorial plane of the tire. Thereby, the properties of the first tread cap layer can be utilized when driving until a remaining groove depth of about 4 mm which is considered in some national legislative bodies as minimum remaining tread thickness for a winter or snow tires. On the other hand, this construction ensures that the second tread cap layer can have a relatively large thickness extending in the radially outer direction in particular radially outside the bottom of the groove which allows to optimize overall rolling resistance of the tread by the second rubber composition of the second tread cap layer.

In another embodiment, said groove (or main groove) may separate two ribs each extending in the circumferential and the axial direction, and/or in a curved shape, preferably in an area between the equatorial plane of the tire or centerline of the tire and a shoulder portion of the tire tread, for example in an essentially V-shaped tread pattern.

In still another embodiment, the second tread cap layer extends at least 2 mm, preferably at least 3 mm, in a radially outer direction from the radial position of the bottom of the groove. The second tread cap layer may also extend below to a position radially inside of the bottom of the groove and will typically do so, such as to a position from 1 mm to 3 mm radially inward of the bottom of said groove.

In another embodiment, most of the radial thickness of the second tread cap layer is radially above the bottom of the groove.

In still another embodiment, a maximum radial thickness of the second tread cap layer is within a range of 60% to 90% (preferably 65% to 85%) of a maximum radial thickness of the first tread cap layer. Thus, in this embodiment it is preferred to have a thinner second tread cap layer than the first tread cap layer, which helps further to reduce weight when considering the total tread cap thickness.

In still another embodiment, a maximum radial thickness of the second tread cap layer is within a range of 25% to 150% of the maximum radial thickness of the first tread cap layer, preferably within a range of 40% to 120%, or even 50% to 100%.

In still another embodiment, a maximum radial thickness of the second tread cap layer is 20% to 60%, preferably 40% to 60%, of the maximum radial thickness of the total maximum thickness of the first tread cap layer and the second tread cap layer.

In still another embodiment, the total maximum thickness for the first tread cap layer and the second tread cap layer is within a range of 6 mm to 10 mm, preferably of 7 mm to 9 mm.

In yet another embodiment, the first tread cap layer has over at least 80% (or over at least 90%) of its lateral or axial width a radial thickness within a range of t−1 mm to t+1 mm (or t−0.5 mm to t+1 mm; or t to t+1 mm; or t+0.5 mm). In other, words the thickness of the first tread cap layer is relatively similar over its axial extension. In particular, such thickness values apply to the unworn tread.

In still another embodiment, said radial thickness (or in other words maximum radial thickness) of the first tread cap layer is within a range of 3 mm to 5 mm, preferably 3.5 mm to 4.5 mm.

In still another embodiment, the tire further comprises a tread base layer, which is essentially arranged radially inside of the first and second tread cap layers and supporting the second tread cap layer. The tread base layer may have an extension extending in a radially outer direction though, such as in the shoulder and/or sidewall areas of the tire or in the form of an axially extension to the radially outermost surface of a tread block or rib of the tread (such extensions are also known in the tire art as chimneys).

In yet another embodiment, the tread base layer comprises a third rubber composition different from said first and second rubber compositions, wherein the third rubber composition has a rebound resilience, determined at a temperature of 100° C. according to DIN 53512, which is at least 10% (preferably 20% or 30% higher and/or optionally at most 50% or 40%) higher than the rebound resilience of the second rubber composition, determined at a temperature of 100° C. according to DIN 53512. Thus, the tread base layer has an even better rolling resistance than the layers supported by the tread base layer.

In still another embodiment, the tread base layer has over at least 70% of its axial width from 5% to 30% of the radial thickness of the first tread cap layer. Thus, the tread base layer is relatively thin.

In still another embodiment, the tread base layer has over at least 70% of its axial width a radial thickness which is within a range of 0.2 mm to 2 mm, preferably from 0.3 mm to 1.7 mm.

In still another embodiment, the first rubber composition and the second rubber composition comprise each predominantly silica as a filler. Such a silica may optionally also be a pre-silanized silica as further described herein below. In particular, the use of pre-silanized silica is preferred for the composition of the second tread cap layer.

In still another embodiment, the tread base layer comprises a third rubber composition having a filler comprising predominantly carbon black. The third rubber composition may comprise less than 10 phr, preferably less than 5 phr, of silica or may be essentially silica free.

In another embodiment, the tread base layer, or in other words its rubber composition, may be electrically conductive. Preferably, its electrical resistivity is smaller than $10^8$ Ω cm, or smaller than $10^7$ Ω cm, or even more preferably smaller than $10^6$ Ω cm.

In another embodiment, the tread base layer comprises at least 30 phr of carbon black or from 30 phr to 70 phr of carbon black, preferably from 40 phr to 70 phr of carbon black or from 40 to 60 phr of carbon black.

In still another embodiment, the tread base layer comprises at least one extension extending radially outwards until a radially outermost surface of the first tread cap layer, the extension having an axial width of less than 5% of the total axial width of the tread base layer. Such an extension may form an electrically conductive path from the outermost (unworn) surface of the tread or first tread cap layer to the tread base layer and a belt portion of the tire arranged radially inside of the third tread cap layer, in other words the tread base layer.

In yet another embodiment, the first rubber composition comprises from 50 phr to 100 phr of at least one diene-based elastomer, such as a solution-polymerized styrene-butadiene rubber (SSBR) or a polybutadiene, having a glass transition temperature (Tg) of up to (or maximum) −50° C., and/or from 100 phr to 200 phr of silica. Such a combination of the SSBR with relatively a low Tg and silica as a filler is particularly desirable for a snow tire.

In yet another embodiment, the second rubber composition comprises from 50 phr to 100 phr of at least one diene-based elastomer, such as a solution-polymerized styrene-butadiene rubber or a polybutadiene, having a glass transition temperature of up to (or maximum) −50° C., and from 90 phr to 160 phr of silica. Again, it is desirable in the present context that the SSBR has a relatively low Tg. The SSBRs of the first and second compositions may be the same or different.

In still another embodiment, the Tg of said elastomer, e.g. SSBR or polybutadiene, is within a range of −50° C. to −95° C., or −50° C. to −90° C., or −50° C. to −85° C.

In still another embodiment, the Tg of said SSBR is within a range of −55° C. to −70° C.

In still another embodiment, the first rubber composition comprises from 5 phr to 75 phr, 10 phr to 60 phr, 10 phr to 55 phr, or 5 phr to 30 phr of at least one resin or traction resin, in other words traction promoting resin.

In still another embodiment, said resin is selected from at least one of styrene-alphamethylstyrene resin, coumarone-indene resin, petroleum hydrocarbon resin, terpene polymer, terpene phenol resin, rosin derived resins and copolymers. Preferably, said resin may be one or more of an alpha pinene terpene, a DCPD resin, a hydrogenated and/or C9 modified DCPD resin, and a C9 modified C5 resin.

In still another embodiment, said resin has a softening point determined in accordance with ASTM E28 in a range of from 60° C. to 150° C., preferably from 85° C. to 140° C., or even more preferably from 100° C. to 140° C.

In yet another embodiment, said resin or traction resin has a glass transition temperature which is within a range of 30° C. to 80° C., preferably 60° C. to 75° C., or even more preferably 60° C. to 70° C. These ranges can help to further improve the wet performance.

In still another embodiment, the first rubber composition comprises from 3 phr to 20 phr of an oil, preferably having a glass transition temperature within a range of −70° C. to −115° C. In particular, the combination of a relatively high Tg (traction) resin with a relatively low Tg oil helps to provide a low compound Tg desired for a snow tire and achieving still good traction properties such as wet and/or dry traction. The glass transition temperature of an oil can be suitably determined as a peak midpoint by a differential scanning calorimeter (DSC) at a temperature rate of increase of 10° C. per minute, according to ASTM E1356 or equivalent.

In another embodiment, the first and/or the second rubber composition has less than 5 phr of oil, preferably less than 3 phr of oil or be even essentially oil-free, or have 0 phr of oil.

In still another embodiment, said oil is triglyceride such as a vegetable oil selected from one or more of sunflower oil, soybean oil and canola oil. In a preferred embodiment the oil is sunflower oil. In another preferred embodiment the oil is soybean oil.

In yet another embodiment, the first rubber composition comprises from 0 phr to 45 phr of polybutadiene having a glass transition temperature within a range of −100° C. to −115° C., and 55 phr to 100 phr of the solution-polymerized styrene-butadiene rubber. In particular, the polybutadiene can for instance be used to further decrease the compound Tg.

In still another embodiment, the second rubber composition comprises at least 5 phr less silica than the first rubber composition, or the second rubber composition comprises between 5 phr and 20 phr or between 5 phr and 10 phr less silica than the first rubber composition. In particular, the lower filler content may further help to reduce overall rolling resistance of the tread.

In yet another embodiment, the first rubber composition comprises from 0 phr to 20 phr of polybutadiene having a glass transition temperature within a range of −100° C. to −115° C. and 80 to 100 phr of the solution-polymerized styrene-butadiene rubber.

In yet another embodiment, the first rubber composition comprises from 5 phr to 20 phr of polybutadiene having a glass transition temperature within a range of −100° C. to −115° C. and 80 to 95 phr of the solution-polymerized styrene-butadiene rubber.

In yet another embodiment, the second rubber composition comprises optionally from 5 phr to 20 phr of polyisoprene, from 5 phr to 20 phr of polybutadiene, and from 60 phr to 90 phr of the solution-polymerized styrene-butadiene rubber.

In yet another embodiment, the second rubber composition comprises further from 5 phr to 40 phr of a resin and/or from 5 phr to 25 phr of an oil. In still another embodiment, the tire is a passenger car tire such as a passenger car snow tire.

In another preferred embodiment, the sum of the amount of the resin and the amount of the oil in the first rubber composition is within a range of 35 phr to 75 phr, preferably 35 phr to 60 phr, or even more preferably 35 phr to 55 phr, or 35 phr to 45 phr, or 35 phr to 43 phr.

In another embodiment, the resin is present at a level which is within a range of 20 phr to 35 phr, and/or the oil is present at a level which is within a range of 5 phr to 20 phr.

In another preferred embodiment, the ratio, by weight, of the oil to the resin is lower than 1:1.5 or optionally within the range of 1:1.5 to 1:3.5, or preferably of 1:1.5 to 1:3 (all by phr). Such ratios have been found to be most preferable.

In still another embodiment, the diene-based elastomer such as the solution-polymerized styrene butadiene rubber has a styrene content which is within a range of 4% to 20% by weight and/or a vinyl content which is within a range of 10% to 40% by weight, based on the butadiene content.

In another embodiment, suitable oils may include various oils, including aromatic, paraffinic, naphthenic, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. As mentioned above, the oil may preferably be a vegetable oil or vegetable oil derivate (such as sunflower oil, soybean oil or canola oil) or a blend of multiple oils, in particular sunflower oils. Some representative examples of vegetable oils that can be used include soybean oil, sunflower oil, canola (rapeseed) oil, corn oil, coconut oil, cottonseed oil, olive oil, palm oil, peanut oil, and safflower oil. In another preferred embodiment, said oil has a glass transition temperature ranging between −70° C. and −115° C., preferably from −75° C. (or even −80° C.) to −115° C. In particular, the low Tg of the oil may support snow performance. Merely as an example, such low Tg oil is available as Pionier™ TP 130 B or Pionier™ TP 130 C of the company H&R.

In still another embodiment, the rubber composition further comprises from 1 phr to 10 phr of a sulfur containing an organosilicon compound or silane. Such a silane may help to improve the binding of the silica to the rubber matrix. In the present case, such amounts of silane have been found to be desirable. In another preferred embodiment, the amount of silane ranges from 3 phr to 10 phr. In particular, examples of suitable sulfur containing organosilicon compounds/silanes are of the formula:

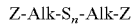

in which Z is selected from the group consisting of:

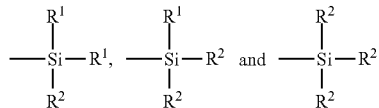

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In another embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

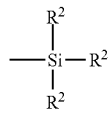

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials. In another embodiment, suitable sulfur containing organosilicon compounds include those disclosed in U.S. Patent Publication No. 2003/0130535. In one embodiment, the sulfur containing organosilicon compound is Si-363 from Degussa. The amount of the sulfur containing organosilicon compound in a rubber composition may vary depending on the level of other additives that are used.

In another embodiment, the rubber composition includes a resin (such as a hydrocarbon resin) having a Tg greater than 30° C., preferably greater than 50° C., and more preferably greater than 60° C., and optionally lower than 100° C., such as hydrocarbon resins described in "Hydrocarbon Resins" by R. Mildenberger, M. Zander and G. Collin (New York, VCH, 1997, ISBN-3-527-28617-9). Representative hydrocarbon resins include for instance coumarone-indene-resins, petroleum resins, terpene resins, alphamethyl styrene resins and mixtures thereof. In particular, such a relatively high resin Tg is considered to be beneficial for wet grip, with limited impact on rolling resistance.

Coumarone-indene resins are commercially available in many forms with melting points ranging from 10° to 160° C. (as measured by the ball-and-ring method). Preferably, the melting point ranges from 30° to 100° C. Coumarone-indene resins as such are well known. Various analysis indicate that such resins are largely polyindene; however, typically contain random polymeric units derived from methyl indene, coumarone, methyl coumarone, styrene and methyl styrene.

Petroleum resins are commercially available with softening points ranging from 10° C. to 120° C. Preferably, the softening point ranges from 30° to 100° C. Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene.

In a preferred embodiment, terpene resins are used in the present composition. Terpene polymers (or resins) may be typically commercially produced from polymerizing alpha or beta pinenes. In particular, alpha pinene based resins may be used. Terpene resins may be supplied in a variety of melting points ranging from 10° C. to 135° C. The terpene resins may for example have a molecular weight $M_w$ of less than 1000 g/mol, preferably less than 950 g/mol or ranging between 200 g/mol and 950 g/mol, as measured by gel permeation chromatography (GPC). An example of an alpha pinene based resin is Dercolyte™ A 115 of the company DRT which has a molecular weight $M_w$ of about 900 g/mol.

In one embodiment, the resin is derived from styrene and alphamethylstyrene. The presence of the styrene/alphamethylstyrene resin within a rubber blend which contains the presence of the styrene-butadiene elastomer is considered herein to be beneficial because of observed viscoelastic properties of the tread rubber composition such as complex and storage modulus, loss modulus, tangent delta and loss compliance at different temperature/frequency/strain. The properties of complex and storage modulus, loss modulus, tangent delta and loss compliance are understood to be generally well known to those having skill in such art. The molecular weight distribution of the resin is visualized as a ratio of the resin's molecular weight average (Mw) to molecular weight number average (Mn) values and is considered herein to be in a range of about 1.5/1 to about 2.5/1 which is considered to be a relatively narrow range. This is believed to be advantageous because of the selective compatibility with the polymer matrix and because of a contemplated use of the tire in wet and dry conditions over a wide temperature range. The glass transition temperature (Tg) of the copolymer resin is considered herein to be in a range of about 20° C. to about 100° C., alternatively about 50° C. to about 70° C. A resin Tg is determined as a peak midpoint by a differential scanning calorimeter (DSC) at a temperature rate of increase of 10° C. per minute, according to ASTM D6604 or equivalent. The styrene/alphamethylstyrene resin is considered herein to be a copolymer of styrene and α-methylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent. Thus, the contemplated styrene/α-methylstyrene resin can be characterized, for example, by its chemical structure, namely, its styrene and α-methylstyrene contents and softening point and also, if desired, by its glass transition temperature, molecular weight and molecular weight distribution. In one embodiment, the styrene/alphamethylstyrene resin is composed of about 40 to about 70 percent units derived from styrene and, correspondingly, about 60 to about 30 percent units derived from alphamethylstyrene. In one embodiment, the styrene/alphamethylstyrene resin has a softening point according to ASTM E-28 in a range of about 80° C. to about 145° C. Suitable styrene/alphamethylstyrene resin is available commercially as Resin 2336 from Eastman or Sylvares SA85 from Arizona Chemical.

In another embodiment, the first and/or second rubber composition comprises from 90 phr to 200 phr of silica. Such relatively high amounts of silica have been found to be of particular interest in the present composition, in particular to allow improved wet traction.

In another preferred embodiment, the first rubber composition comprises from 100 phr to 200 phr of silica or preferably from 110 phr to 200 phr of silica, or even more preferably from 110 phr to 150 phr of silica, or from 115 phr to 150 phr of silica.

To reduce rolling resistance, it is desired, in accordance with another embodiment, that the second rubber composition comprises from 90 phr to 120 phr of silica, preferably from 100 phr to 115 phr of silica or from 100 phr to 110 phr of silica.

Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g. sodium silicate. Such conventional silicas might be characterized, for example, by having a BET surface area, as measured using nitrogen gas according to ASTM D6556. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300, determined according to ASTM D 2414. A conventional silica might be expected to have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc., silicas available from Solvay, with, for example, designations of Z1165MP and Premium200MP, etc. and silicas available from Evonik AG with, for example, designations VN2 and Ultrasil 6000GR, 9100GR, etc. In another embodiment, the silica has a BET surface area of between 100 m²/g and 250 m²/g.

In another embodiment, the silica may be pre-hydrophobated (or pre-silanized) precipitated silica. In a preferred embodiment, the second rubber composition comprises such a silica which further helps to reduce rolling resistance. By pre-hydrophobated, it is meant that the silica is pretreated, i.e., the pre-hydrophobated precipitated silica is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes. In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731 the teachings of which are incorporated herein by reference. The pre-hydrophobated precipitated silica may optionally be treated with a silica dispersing aid. Such silica dispersing aids may include glycols such as fatty acids, diethylene glycols, polyethylene glycols, fatty acid esters of hydrogenated or non-hydrogenated C5 or C6 sugars, and polyoxyethylene derivatives of fatty acid esters of hydrogenated or non-hydrogenated C5 or C6 sugars. Exemplary fatty acids include stearic acid, palmitic acid and oleic acid. Exemplary fatty acid esters of hydrogenated and non-hydrogenated C5 and C6 sugars (e.g., sorbose, mannose, and arabinose) include, but are not limited to, the sorbitan oleates, such as sorbitan monooleate, dioleate, trioleate and sesquioleate, as well as sorbitan esters of laurate, palmitate and stearate fatty acids. Exemplary polyoxyethylene derivatives of fatty acid esters of hydrogenated and non-hydrogenated C5 and C6 sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Optional silica dispersing aids if used are present in an amount ranging from about 0.1% to about 25% by weight based on the weight of the silica, with about 0.5% to about 20% by weight being suitable, and about 1% to about 15% by weight based on the weight of the silica also being suitable. For various pre-treated precipitated silicas see, for example, U.S. Pat. Nos. 4,704,414 6,123,762, and 6,573,324. The teaching of U.S. Pat. Nos. 4,704,414, 6,123, 762, and 6,573,324 are incorporated by reference herein.

In an embodiment, the rubber composition may include carbon black. In particular, the third rubber composition may predominantly comprise carbon black as a filler material. Representative examples of carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg determined according to ASTM D1510 and DBP numbers ranging from 34 cm³/100 g to 150 cm³/100 g, determined according to ASTM D 2414. The amount of carbon black is typically desired to be rather small in the first and/or second composition so that such compositions comprise in an embodiment even less than 5 phr of carbon black, preferably between 1 phr and 5 phr of carbon black.

In another embodiment, other fillers may additionally be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395, 891; and 6,127,488, and plasticized starch composite fillers including but not limited to that disclosed in U.S. Pat. No. 5,672,639. The teachings of U.S. Pat. Nos. 6,242,534; 6,207,757; 6,133,364; 6,372,857; 5,395,891; 6,127,488, and 5,672,639 are incorporated herein by reference.

In one embodiment, cis 1,4-polybutadiene rubber (BR or PBD) may be prepared, for example, by organic solution polymerization of 1,3-butadiene. The BR optionally has at least a 90 percent cis 1,4-content. Suitable polybutadiene rubbers are available commercially, such as Budene® 1207, Budene® 1208, or Budene® 1223 high cis-1,4-polybutadiene rubber from The Goodyear Tire & Rubber Company. In still another embodiment, the polybutadiene has a glass transition temperature from −100° C. to −115° C. or from −100° C. to −110° C. The relatively low Tg of the polybutadiene is amongst others of interest to keep the compound in a preferred Tg range for winter properties.

In general, a reference to a glass transition temperature, or Tg, of an elastomer or elastomer composition, where referred to herein, represents the glass transition temperature of the respective elastomer or elastomer composition in its uncured state. A Tg is determined as a peak midpoint by a differential scanning calorimeter (DSC) at a temperature rate of increase of 10° C. per minute, according to ASTM D3418 or equivalent.

The term "phr" as used herein, and according to conventional practice, refers to parts by weight of a respective material per 100 parts by weight of rubber, or elastomer. In general, using this convention, a rubber composition is comprised of 100 parts of by weight of the rubber/elastomer.

The claimed composition may comprise further rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 5 phr of one or more additional diene-based rubbers, such as styrene butadiene rubber (SBR), solution-polymerized styrene butadiene rubber (SSBR), emulsion-polymerized styrene butadiene rubber (ESBR), PBD, natural rubber (NR) and/or synthetic polyisoprene. In another example, the composition may only include less than 5 phr, preferably less than 3 phr of an additional diene-based rubber or be also essentially free of such an additional diene-based rubber. The terms "compound" and "composition" may be used herein interchangeably, unless indicated otherwise. If an amount of ingredient is mentioned with "up to" herein, this shall include also the option of 0 (zero) phr of that ingredient or "from 0 to".

In another embodiment, the SSBR may for instance have a bound styrene content in a range of 5% to 50%, preferably 9% to 36%. In still another embodiment, the SSBR has a styrene content in the range of between 10% and 20% by weight and a vinyl content in the range of between 20% and 40% by weight, based on the butadiene content. In still another embodiment, the SSBR has a styrene content in the range of between 4% and 15% by weight and a vinyl content in the range of between 10% and 25% by weight, based on the butadiene content. In still another embodiment, the solution styrene butadiene rubber is a tin-coupled polymer. In still another embodiment, the SSBR is functionalized, as e.g. for improved compatibility with the silica. In addition, or alternatively, the SSBR is thio-functionalized. This may help to improve stiffness of the compound and/or its hysteresis behavior. Thus, for instance, the SSBR may be a thio-functionalized and/or tin-coupled solution-polymerized copolymer of butadiene and styrene.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.2 phr to 8 phr, alternatively with a range of from 1 phr to 3 phr. Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3.5 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one non-productive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In particular, the tire may be in an embodiment of the invention one of: a radial tire, a pneumatic tire, a non-pneumatic tire, a truck tire and a passenger car tire. Thus, the tire, such as a snow tire, may have a plurality of tread blocks, optionally having a plurality of sipes.

It is emphasized that one or more aspects, embodiments, or features thereof, may be combined with one another within the scope of the present invention.

BRIEF DESCRIPTION OF THE DRAWINGS

The structure, operation, and advantages of the invention will become more apparent upon contemplation of the following description taken in conjunction with the accompanying drawings.

DETAILED DESCRIPTION OF THE INVENTION

Figure 1:
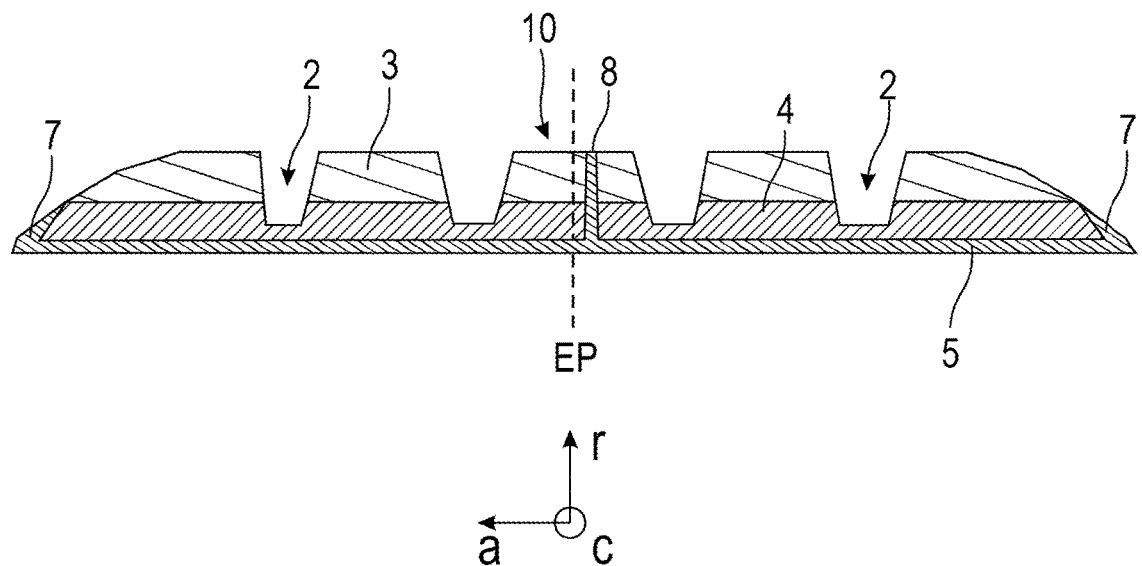
FIG. 1 is a schematic cross section of a tire tread in accordance with an embodiment of the present invention.

FIG. 1 is a schematic cross-section of a tire tread 10 in accordance with an embodiment of the present invention. The tire tread 10 comprises multiple grooves 2 and two tread cap layers 3, 4, wherein a radially outer tread cap layer, or in other words a first tread cap layer 3 is provided to contact the road when driving and a radially inner tread cap layer or second tread cap layer 4 is supporting the first tread cap layer 3. In the embodiment of FIG. 1, the second tread cap layer 4 has a smaller radial thickness than the first tread cap layer 3. A tread base layer 5 is arranged radially inside of the tread cap layers 3, 4, supporting the second tread cap layer 4. In particular, each one of these layers 3, 4, 5 is made of a different rubber composition. Each of the tread cap layers 3, 4 and the tread base layer 5 extend around the tire in a circumferential direction c and also in an axial direction a, wherein these directions are perpendicular to the radial direction r of the tire as indicated in FIG. 1. The term axial direction as used herein means a direction which is parallel to the axis of rotation of the tire. The circumferential direction c is essentially parallel to the circumference of the tire and/or parallel to the equatorial plane of the tire EP. The radial direction r is perpendicular to the axial direction a. While the tread 10 is shown with four circumferential grooves 2, it is also possible that the tire has more or less circumferential grooves, such as one, two, three or five circumferential grooves. Such grooves may extend essentially in the circumferential direction c and may also be referred to as main grooves. In particular, the tire tread 10 may have one (axially) central circumferential groove such as in a case where the tread pattern is an essentially V-shaped tread pattern extending away from the axial centerline, or in other words from the equatorial plane EP, of the tire. The tread pattern may also be essentially V-shaped. In such a case the tread has grooves separating two adjacent ribs of the tread which extend essentially in a V-shaped pattern.

Preferably, the radial thickness of the tread base layer 5 is along at least 80% of its axial width smaller than the maximum radial thickness of the first tread cap layer 3 and also the maximum radial thickness of the second tread cap layer 4. The tread base layer has in the present non-limiting embodiment at axially outermost portions radial extensions 7, which may also be called skirt portions. Moreover, it has another radial extension 8 extending up to the radially outermost surface of the tread in a rib and/or at least one tread block adjacent the equatorial plane EP of the tire. An average axial width of this extension along its radial length is preferably smaller than 5% of the total axial width of the tread base layer 5 and/or within a range of 0.5% and 5% of said total axial width. This extension may serve as conductive chimney, in particular in case of electrically non-conductive first and/or second tread cap layers 3, 4.

Figure 2:
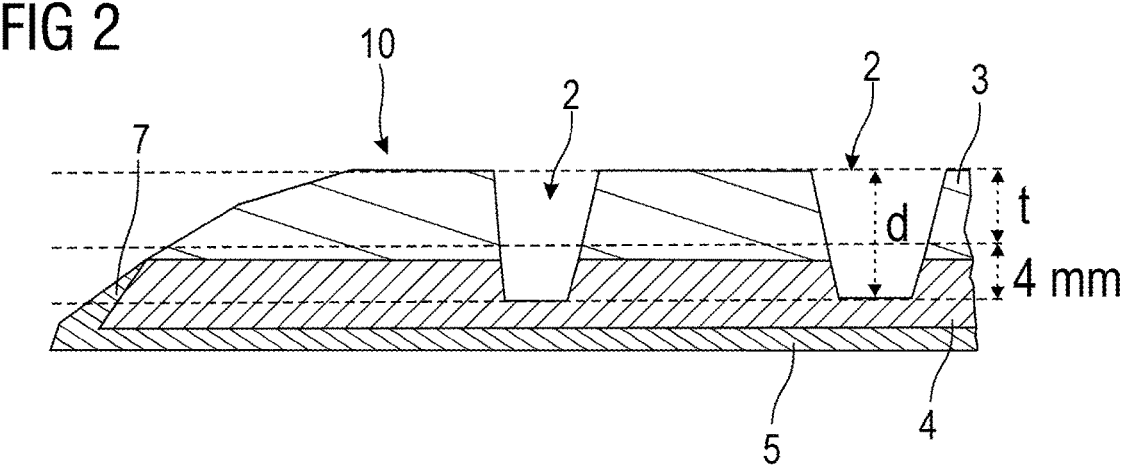
FIG. 2 is a magnified partial cross section of the tire tread shown in FIG. 1.

As depicted in FIG. 2, which shows a magnified part of the tread according to FIG. 1, the grooves 2 have a radial depth or height d (in mm), which can be described as a radial distance of 4 mm plus the radial distance t (also in mm). In many countries 4 mm is the minimum remaining groove height or depth which allows a tire to drive safely under winter conditions. In the preferred embodiment shown in FIG. 2, the first tread cap layer 3 extends from the radially outermost surface of the tread radially inwards to a position below the 4 mm line, with the latter measured from the bottom of the groove in a radially outer direction. Thus, when the tire wears, it is ensured that it is the rubber composition of the first tread cap layer 3 which is contacting the road when driving. Only when the tire tread 10 is worn more than 1 mm below the 4 mm threshold, the tire will roll on the rubber composition of the second tread cap layer 4 which is rather designed for an improved rolling resistance, whereas the first rubber composition of the first tread cap layer 3 is designed for an improved wet performance. Thus, in a preferred embodiment the thickness of the first tread cap layer 3 (of the unworn tread) is within a range of t to t+1 mm (with t=d−4 mm), measured from the radially outermost surface of the tread 10. Preferably the thickness of the first tread cap layer 3 is measured adjacent a circumferential center groove 2, such as extending along the equatorial plane EP of the tire. If such a groove 2 does not exist, the thickness of the first tread cap layer 3 is determined adjacent a groove 2 which is axially closest to the equatorial plane EP of the tire. Preferably, the thickness of the first tread cap layer 3 is not too large. In other words, it is less desirable to have a first tread cap layer 3 which extends further in an inner radial direction as described herein above. In particular, according to the present embodiment of the invention, it is desired that the second tread cap layer 4 is made of a rubber composition which has a reduced rolling resistance compared to the rubber composition of the first tread cap layer 3. Thus, the radial thickness of the first tread cap layer is preferably not larger than t+1 mm. Moreover, preferably the radial thickness of the second tread cap layer 4 is smaller than the radial thickness of the first tread cap layer. Preferably, the radial thickness of the second tread cap layer 4 is within a range of 60% to 90% of the radial thickness of the first tread cap layer 3. However, in other embodiments it could be within a range of 25% to 150%. In addition, or alternatively, the majority of the radial thickness of the second tread cap layer 4 extends radially above the position of the bottom of the grooves 2. In other words, the second tread cap layer 4 extends with more than 50% of its radial thickness, preferably more than 60% of its radial thickness, radially above the bottom of the grooves 2. Thus, the majority of the tread height of (the first) 4 mm measured radially from the bottom of a groove 2 in a radially outer direction is formed by the second rubber composition which is advantageous for the rolling resistance of the tire tread 10.

Apart from the above described geometry of the tread cap layers 3, 4 and/or the tread base layer 5, the rubber compositions of the respective tread layers 3, 4, 5 are different in their compositions, wherein a rebound resilience of the first rubber composition of the first tread cap layer 3, determined at a temperature of 0° C. according to DIN 53512, is within a range of 10% to 25% (preferably 10% to 20%, or 10% to 19%), and a rebound resilience of the second rubber composition of the second tread cap layer 4, determined at a temperature of 0° C. according to DIN 53512, is within a range of 20% to 35% (preferably 20% to 30%, or 21% to 30%). In particular, the said rebound resilience of the first rubber composition is at least 5%, preferably at least 10% (and optionally at most 20%), lower than said rebound resilience of the second rubber composition. Said rebound resilience at a temperature of 0° C. is an indicator for the wet traction behavior of the tire. In addition, the rebound resilience of the first rubber composition, determined at a temperature of 100° C. according to DIN 53512, is within a range of 45% to 60% (preferably 50% to 60%, or 50% to 59%), and a rebound resilience of the second rubber composition, determined at a temperature of 100° C. according to DIN 53512, is within a range of 60% to 75% (preferably 60% to 70%, or 61% to 70%), wherein said rebound resilience of the second rubber composition, determined at a temperature of 100° C., is at least 3%, preferably 4% or 5% higher (and optionally at most 20% higher) than said rebound resilience of the first rubber composition, determined at a temperature of 100° C. The latter rebound resilience measured at a temperature of 100° C. is considered as an indicator for the rolling resistance of the tread. The above combination has been found to be most preferable by the inventors to obtain a compromise between wet performance and rolling resistance.

The rebound resilience of the tread base layer 5, determined at a temperature of 100° C., is preferably within a range of 70% to 90% or 70% to 85% which is an indicator for an even further improved contribution to the rolling resistance of the tread 10.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples, in accordance with embodiments of the present invention, for rubber compositions of the first tread cap layer 3 are given herein below in Table 1.

TABLE 1

| | Parts by weight (phr) | | |
|---|---|---|---|
| Material | Inventive Example 1 (first tread cap layer) | Inventive Example 2 (first tread cap layer) | Inventive Example 3 (first tread cap layer) |
| SSBR[1] | 90 | 80 | 58 |
| PBR 1 (Tg −108° C.)[2] | 10 | 0 | 42 |
| PBR 2 (Tg −87° C.)[3] | 0 | 20 | 0 |
| Silica[4] | 115 | 115 | 135 |
| Resin 1[5] | 28 | 20.5 | 0 |
| Resin 2[6] | 0 | 0 | 52 |
| Oil[7] | 11.5 | 24 | 4 |
| Antidegradants[8] | 3 | 3 | 3 |
| Waxes | 1.5 | 1.5 | 1.5 |
| Sulfur | 1.2 | 1.3 | 1.2 |
| Silane 1[9] | 7.2 | 7.2 | 8.4 |
| Silane 2[10] | 2 | 2 | 2 |
| Accelerators[11] | 4.8 | 5.3 | 6.4 |
| Stearic Acid | 2 | 2 | 2 |
| Zinc Oxide | 2.5 | 2.5 | 2.5 |

[1] Solution-polymerized styrene butadiene rubber as Sprintan ™ SLR 3402 from Trinseo ™ having a Tg of about −60° C.
[2] Cis-1,4 polybutadiene rubber as Budene ™ 1223 from the Goodyear Tire and Rubber Company, having a Tg of about −108° C.
[3] 1,4 polybutadiene rubber with 10%-12% vinyl content and a Tg of about −87° C.
[4] Precipitated silica with a surface area of about 125 m$^2$/g
[5] Terpene (alpha pinene based) resin having a Tg of about 70° C. as Dercolyte ™ A 115
[6] Aromatic modified aliphatic petroleum hydrocarbon resin having a softening point of about 90° C. as Oppera ™ PR 373 Exxon Mobil
[7] Sunflower oil with a Tg of about −80° C.
[8] Mixed p-phenylene diamine type
[9] As SI266 ™ coupling agent from Evonik Industries
[10] As X50S ™ coupling agent from Evonik Industries
[11] Sulfenamide and guanidine types Table 2 discloses mechanical test results for the Inventive Examples disclosed above in Table 1.

TABLE 2

| | Samples | | |
|---|---|---|---|
| Test | Inventive Example 1 (first tread cap layer) | Inventive Example 2 (first tread cap layer) | Inventive Example 3 (first tread cap layer) |
| Rebound at 0° C. (%) [a] | 19.5 | 19.6 | 13.8 |
| Rebound at 100° C. (%) [a] | 59.5 | 59.9 | 54.1 |
| Abrasion [b] | 95 | 50 | 116 |
| E' at −40° C. (MPa) [c] | 103 | 185 | 180 |
| Tangent Delta (10%) RPA [d] | 0.15 | 0.21 | 0.19 |

[a] Rebound measured on a Zwick Roell 5109 rebound resilience tester according to DIN 53512 at given temperature.
[b] Rotary drum abrasion test according to DIN 53516, smaller value means less abrasion.
[c] The modulus E' was determined by means of a GABO ™ Eplexor ™ tester. The test specimen is subjected to 0.25% sinusoidal deformation at 1 Hz and the temperature is varied.
[d] Data obtained with an RPA 2000 ™ Rubber Process Analyzer of Alpha Technologies based on ASTM D5289.

As shown by the above data, the three inventive compounds have a low rebound value at 0° C. which is an indicator for an advanced wet performance of the rubber composition of the first layer. Rebound values at 100° C. are below 60% which is not considered to be optimal under rolling resistance considerations. While the abrasion of the second example is very low, its modulus is relatively high which means that snow performance can be less favorable than for the first example. Tangent delta (tan δ) is another indicator for the rolling resistance of the compound which can also be compared with the values of the below exemplary compositions of the second tread cap layer.

Table 3 discloses exemplary compositions, in accordance with embodiments of the present invention, for the second tread cap layer 4.

TABLE 3

| | Parts by weight (phr) | |
|---|---|---|
| Material | Inventive Example 4 (second tread cap layer) | Inventive Example 5 (second tread cap layer) |
| SSBR[1] | 75 | 90 |
| PBR (Tg −108° C.)[2] | 10 | 10 |
| Natural Rubber | 15 | 0 |
| Pre-silanized silica[3] | 110 | 110 |
| Resin 1[4] | 27 | 0 |
| Resin 2[5] | 0 | 34 |
| Oil[6] | 17.5 | 10.5 |
| Antidegradants[7] | 3 | 2.5 |
| Waxes | 1.5 | 2.5 |
| Sulfur | 0.4 | 0.4 |
| Silane 1[8] | 0 | 7.2 |
| Silane 2[9] | 2 | 2 |
| Accelerators[10] | 2.3 | 2.2 |
| Stearic Acid | 0 | 2 |
| Crosslinker | 2.2 | 2.2 |
| Zinc Oxide | 2 | 2 |
| Processing aids | 4.5 | 0 |

[1] Solution-polymerized styrene butadiene rubber as Sprintan ™ SLR 3402 from Trinseo ™ having a Tg of about −60° C.
[2] Cis-1,4 polybutadiene rubber as Budene ™ 1223 from the Goodyear Tire and Rubber Company, having a Tg of about −108° C.
[3] Pre-silanized, precipitated silica as Agilon 400 ™ of PPG Industries
[4] Alpha methylstyrene resin with a softening point of 85° C. as Novares Pure 85 AS ™
[5] Terpene (alpha pinene based) resin having a Tg of about 70° C. as Dercolyte ™ A 115
[6] Sunflower oil, with a Tg of about −80° C.
[7] Mixed p-phenylene diamine type
[8] As SI266 ™ coupling agent from Evonik Industries
[9] As X50S ™ coupling agent from Evonik Industries
[10] Sulfenamide and guanidine types Table 4 discloses mechanical test results for the Inventive Examples in relation to the second tread cap layer 4 as disclosed above in Table 2.

TABLE 4

| | Samples | |
|---|---|---|
| Test | Inventive Example 4 (second tread cap layer) | Inventive Example 5 (second tread cap layer) |
| Rebound at 0° C. (%) [a] | 22.6 | 20.0 |
| Rebound at 100° C. (%) [a] | 61.9 | 61.9 |
| Abrasion [b] | 87 | 86 |
| E' at −40° C. (MPa) [c] | 70 | 145 |
| Tangent Delta (10%) RPA [d] | 0.14 | 0.18 |

[a] Rebound measured on a Zwick Roell 5109 rebound resilience tester according to DIN 53512 at given temperature.
[b] Rotary drum abrasion test according to DIN 53516, smaller value means less abrasion.
[c] The modulus E' was determined by means of a GABO ™ Eplexor ™ tester. The test specimen is subjected to 0.25% sinusoidal deformation at 1 Hz and the temperature is varied.
[d] Data obtained with an RPA 2000 ™ Rubber Process Analyzer of Alpha Technologies based on ASTM D5289.

In view of the above results shown in Table 4, the exemplary rubber compositions for the second tread cap layer 4 have higher rebound at 0° C. than the rubber compositions for the first tread cap layer 3. At the same time the compositions for the second tread cap layer 4 have a considerably higher rebound resilience at 100° C. than the rubber compositions for the radially outermost tread cap layer 3. The corresponding improvement in rolling resistance is also indicated by the tangent delta (tan δ) values which are much lower than respective values of the examples for the first rubber composition. The higher rebound resilience values at 0° C. of the Inventive Examples 4 and 5 compared to the Inventive Examples 1 to 3 are less important as a tire will usually not be driven on the radially inner tread cap layer. Apart from that, even the rebound resilience values at 0° C. are still acceptable for the fourth and fifth Inventive Examples.

In another embodiment, a tread base layer formulation may comprise from 50 phr to 80 phr of polyisoprene such as natural rubber, from 20 phr to 50 phr of polybutadiene, from 30 to 60 phr (preferably from 35 phr to 50 phr) of carbon black, and from 1 phr to 10 phr of a tackifier resin. In a specific example tested by the inventors, comprising 65 phr of natural rubber, 35 phr of polybutadiene, 40 phr of carbon black, 4 phr of a phenolic resin and further ingredients such a accelerators, processing aids, antidegradants and vulcanizing agents, a rebound resilience of 78%, measured at 100° C., was determined and a tangent delta of 0.07 based on the same measurement methods as described above for the other Inventive Examples.

Variations in the present invention are possible in light of the provided description. In any case, the above described embodiments and examples shall not be understood in a limiting sense. While certain representative embodiments and details have been shown for the purpose of illustrating the subject invention, it will be apparent to those skilled in this art that various changes and modifications can be made therein without departing from the scope of the subject invention.

What is claimed is:

1. A tire having a tread comprising:
   (a) a first tread cap layer which is adapted to being ground contacting, wherein the first tread cap layer comprises a first rubber composition; and
   (b) a second tread cap layer arranged radially inside of the first tread cap layer and supporting the first tread cap layer, wherein the second tread cap layer comprises a second rubber composition which is different from the first rubber composition;
   wherein a maximum radial thickness of the second tread cap layer is within a range of 60% to 90% of a maximum radial thickness of the first tread cap layer, wherein the rebound resilience of the first rubber composition, as determined at a temperature of 0° C. according to DIN 53512, is within the range of 17% to 25%, and wherein the rebound resilience of the second rubber composition, as determined at a temperature of 0° C. according to DIN 53512, is within the range of 22% to 35%, and wherein said rebound resilience of the first rubber composition is at least 5% lower than said rebound resilience of the second rubber composition as determined at a temperature of 0° C. according to DIN 53512, and
   wherein the rebound resilience of the first rubber composition, as determined at a temperature of 100° C. according to DIN 53512, is within the range of 45% to 65%, and a rebound resilience of the second rubber composition, as determined at a temperature of 100° C. according to DIN 53512, is within the range of 60% to 75%, and wherein said rebound resilience of the second rubber composition, as determined at a temperature of 100° C., is at least 3% higher than said rebound resilience of the first rubber composition, as determined at a temperature of 100° C. according to DIN 53512,
   wherein the first rubber composition is comprised of 5 phr to 20 phr of a polybutadiene rubber having a glass transition temperature within a range of −100° C. to −115° C., and 80 phr to 95 phr of a solution styrene butadiene rubber, wherein the solution styrene-butadiene rubber has a styrene content which is within the range of 4% to 20%, and wherein the solution styrene-butadiene rubber has a vinyl content which is within the range of 10% to 40%, and wherein the second rubber composition is comprised of 5 phr to 20 phr of a polyisoprene rubber, 5 phr to 20 phr of polybutadiene rubber, and 60 to 90 phr of the solution styrene-butadiene rubber having a styrene content which is within the range of 4% to 20% and a vinyl content which is within the range of 10% to 40%.

2. The tire of claim 1 wherein the first rubber composition includes from 100 phr to 200 phr of silica, and wherein the second rubber composition includes from 90 phr to 150 phr of silica.

3. The tire of claim 2 wherein the first rubber composition is comprised of 5 phr to 60 phr of at least one traction resin selected from the group consisting of styrene-α-methylstyrene resin, coumarone-indene resin, petroleum hydrocarbon resin, terpene polymer, terpene phenol resin, rosin derived resins and copolymers, and wherein said resin has a softening point as determined in accordance with ASTM E28 which is in a range of 60° C. to 150° C.

4. The tire of claim 2 wherein the first rubber composition is comprised of 3 phr to 20 phr of an oil having a glass transition temperature which is within the range of −70° C. to −115° C.

5. The tire of claim 2 wherein the first rubber composition is comprised of 55 phr to 100 phr of a solution styrene-butadiene rubber.

6. The tire of claim 2 wherein the second rubber composition is comprised of silica at a level which is within the range of 90 phr to 115 phr, and wherein the silica is present at a level which is at least 5 phr less than the level of the silica in the first rubber composition.

7. The tire of claim 1 wherein the second rubber composition comprises a pre-silanized precipitated silica.

8. The tire of claim 1 wherein the solution styrene-butadiene rubber is thio-functionalized.

9. The tire of claim 1 wherein the solution styrene-butadiene rubber is tin-coupled.

10. The tire of claim 1 wherein the solution styrene-butadiene rubber is both thio-functionalized and tin-coupled.

11. The tire of claim 10 wherein the solution styrene-butadiene rubber has a styrene content which is within the range of 4% to 15%.

* * * * *